Figure 1:
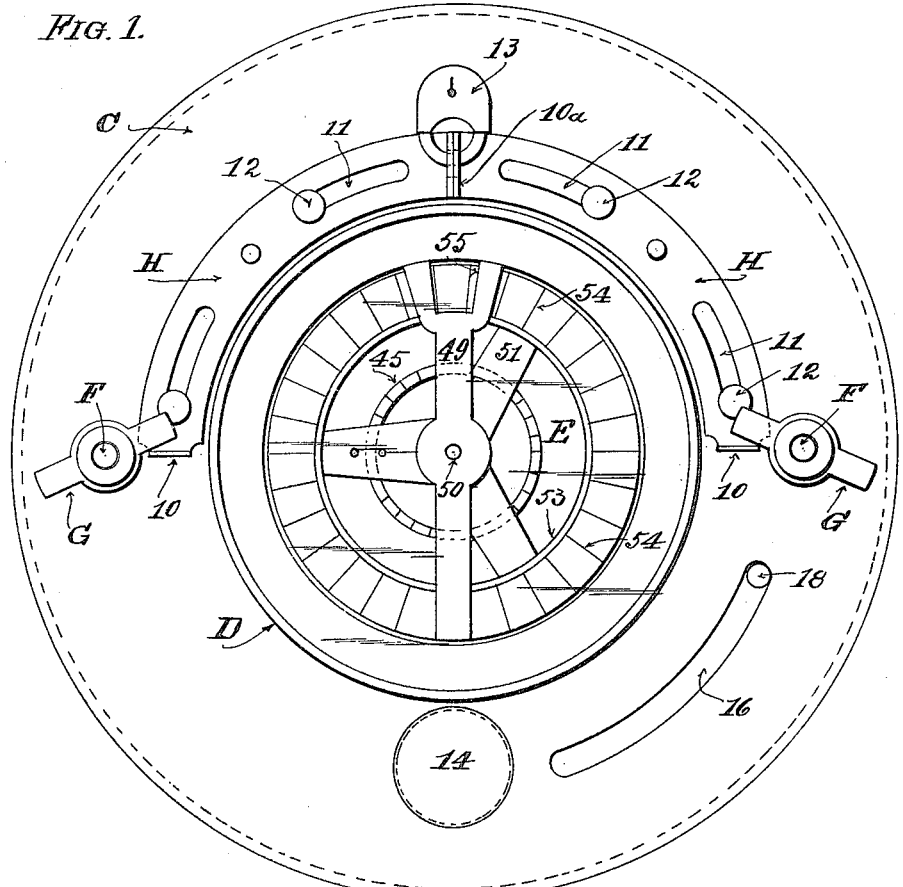

G. KERN.
COIN CONTROLLED MACHINE.
APPLICATION FILED JUNE 8, 1916.

1,225,720.

Patented May 8, 1917.
6 SHEETS—SHEET 1.

WITNESSES:
C. B. Knudsen,
A. G. Peterson.

INVENTOR:
GEORGE KERN.
BY Michael J. Stark & Sons
ATTORNEYS.

G. KERN.
COIN CONTROLLED MACHINE.
APPLICATION FILED JUNE 8, 1916.

1,225,720.

Patented May 8, 1917.
6 SHEETS—SHEET 4.

WITNESSES:
C. R. Knudsen,
A. G. Veterson.

INVENTOR:
GEORGE KERN.
BY Michael J. Stars Son
ATTORNEYS.

G. KERN.
COIN CONTROLLED MACHINE.
APPLICATION FILED JUNE 8, 1916.
1,225,720.
Patented May 8, 1917.
6 SHEETS—SHEET 6.
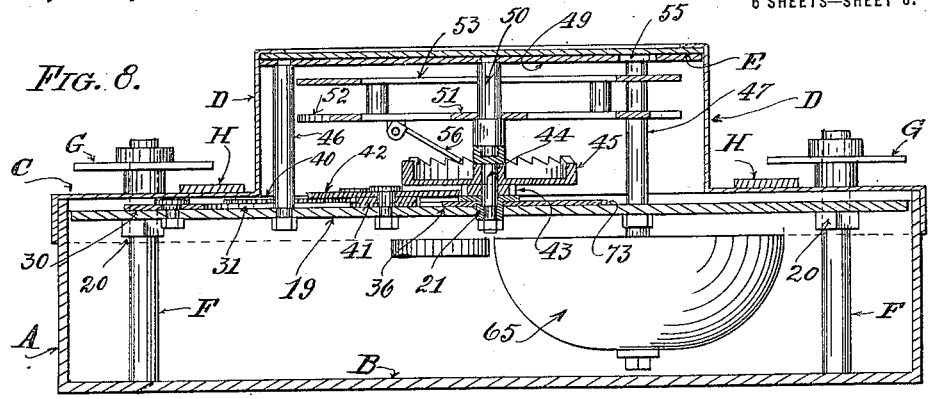
Fig. 8.
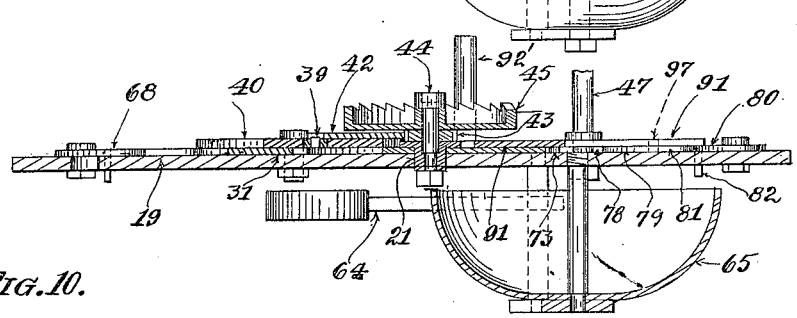
Fig. 9.
Fig. 10.
WITNESSES:
C. B. Knudsen,
A. G. Peterson.
INVENTOR:
GEORGE KERN,
BY Michael J. Stark & Sons
ATTORNEYS.

UNITED STATES PATENT OFFICE.

GEORGE KERN, OF PERU, ILLINOIS.

COIN-CONTROLLED MACHINE.

1,225,720.  Specification of Letters Patent.  Patented May 8, 1917.

Application filed June 8, 1916.  Serial No. 102,438.

*To all whom it may concern:*

Be it known that I, GEORGE KERN, a subject of the Emperor of Germany, and a resident of the city of Peru, in the county of La Salle, and State of Illinois, have invented a certain new and useful Improvement in Coin-Controlled Machines; and I do hereby declare that the following description of my said invention, taken in connection with the accompanying sheet of drawing, forms a full, clear, and exact specification, which will enable others skilled in the art to which it appertains to make and use the same.

My invention relates generally to improvements in coin controlled machine and it consists, essentially, in the novel and peculiar combination of parts and details of construction, as hereinafter first fully set forth and described and then pointed out in the claims.

The object of this invention is to provide an attractive device for cigar counters, candy counters, and the like, constructed to attract the attention of possible purchasers; and which device is provided with coin-actuated means wherein there is located, on a rotatable dial, symbols or characters denoting as to whether the person depositing a coin within the machine and actuating the same, is entitled to a premium over and above the purchase value of the merchandise for which the coin was tendered in payment.

In general, the device comprises a, preferably, cylindrical casing forming a coin depository. Surmounting the cover of this casing, there is a dome having a glass top within which there is located a rotatable dial upon the visible face of which are imprinted certain symbols or characters. Provided on the cover of the casing there is a coin-chute and slot; and within the case are located certain links, levers, and cams in operative relationship, which mechanism is under the control of a coin inserted into the coin-chute. Upon depositing a coin of proper denomination, the same drops into operative position adjacent a coin-impelling lever; and when this lever is manually moved, the coin is first impelled along a coin guide-way and caused to impart motion to mechanism hereinafter described, resulting in rapid rotation of the dial aforesaid. At the end of the stroke of this coin-impelling lever, the coin drops into the interior of the casing; and upon the spring impelled return of the coin-impelling lever to its original position, devices are acted upon causing the sudden stoppage of the rotating dial. If this dial happens to stop at certain predetermined symbols or characters on said dial, the depositor of the coin is entitled to a premium in merchandise over and above the merchandise for which the coin was offered in payment. Thus, if cigars is the vendible on sale, the stoppage of the dial at the predetermined points entitles the depositor to an additional cigar in addition to the one paid for. The especial aim of the invention is to produce a device to "draw trade" in that paying for merchandise by depositing the coin in the machine, an opportunity is afforded to obtain a premium.

Figure 2:
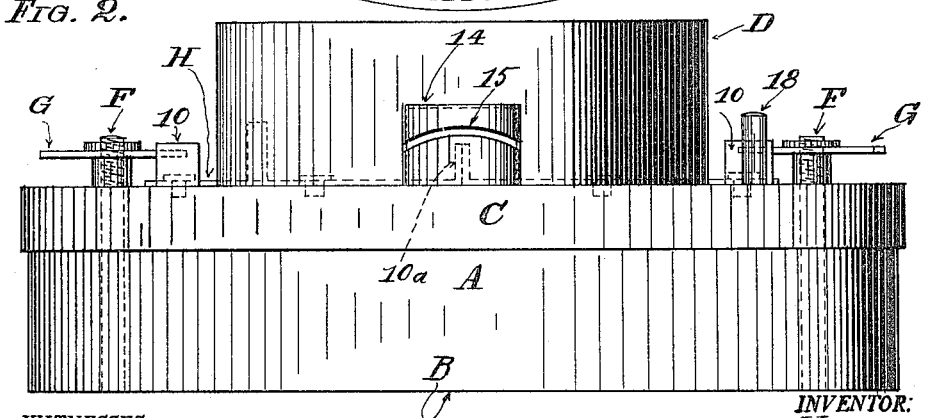
Figure 3:
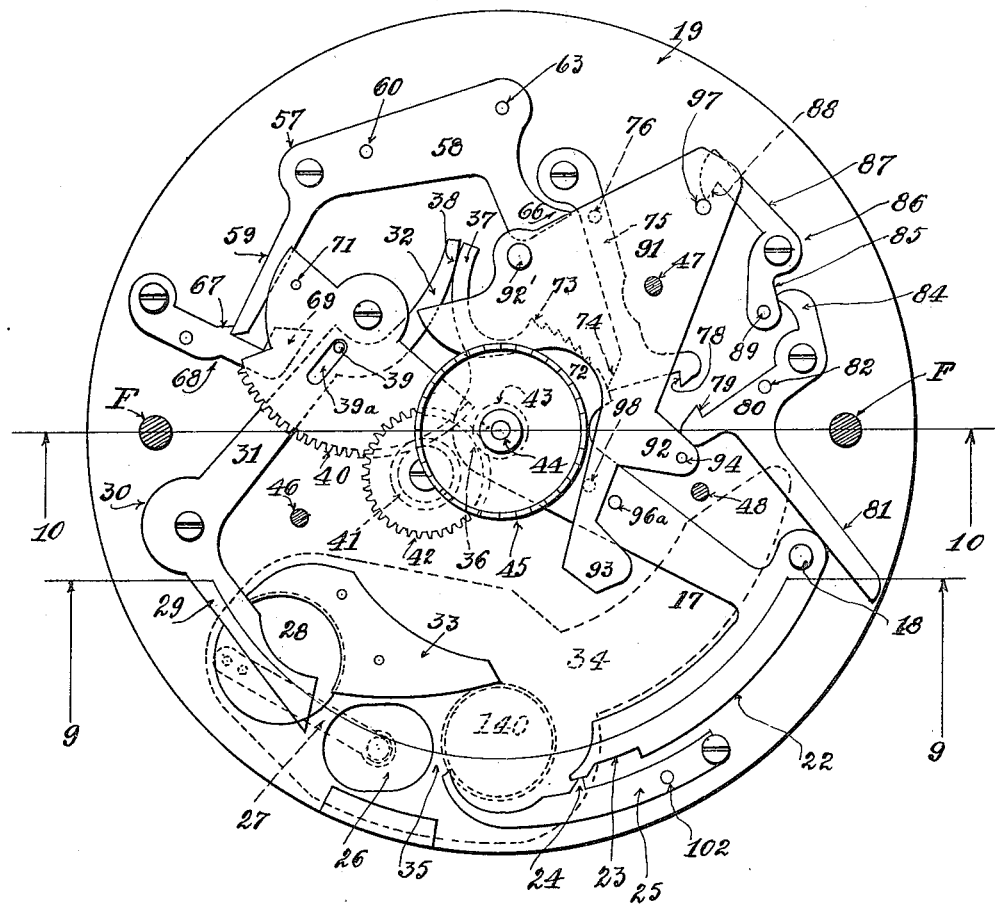
Figure 4:
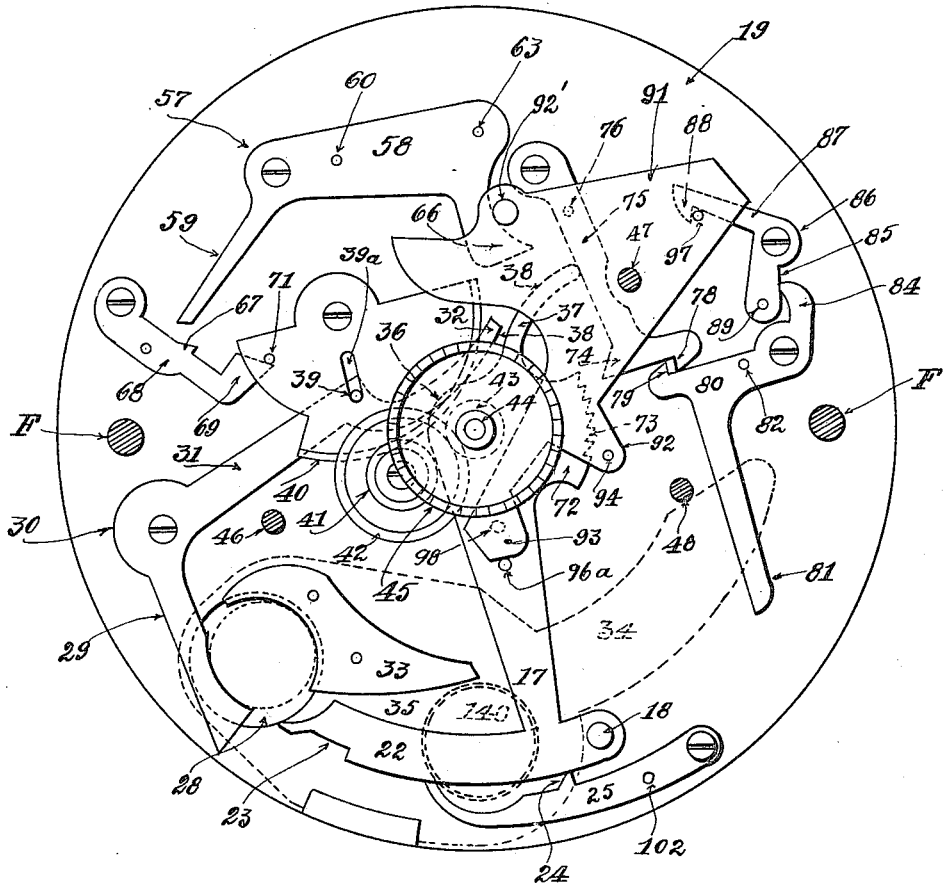
Figure 5:
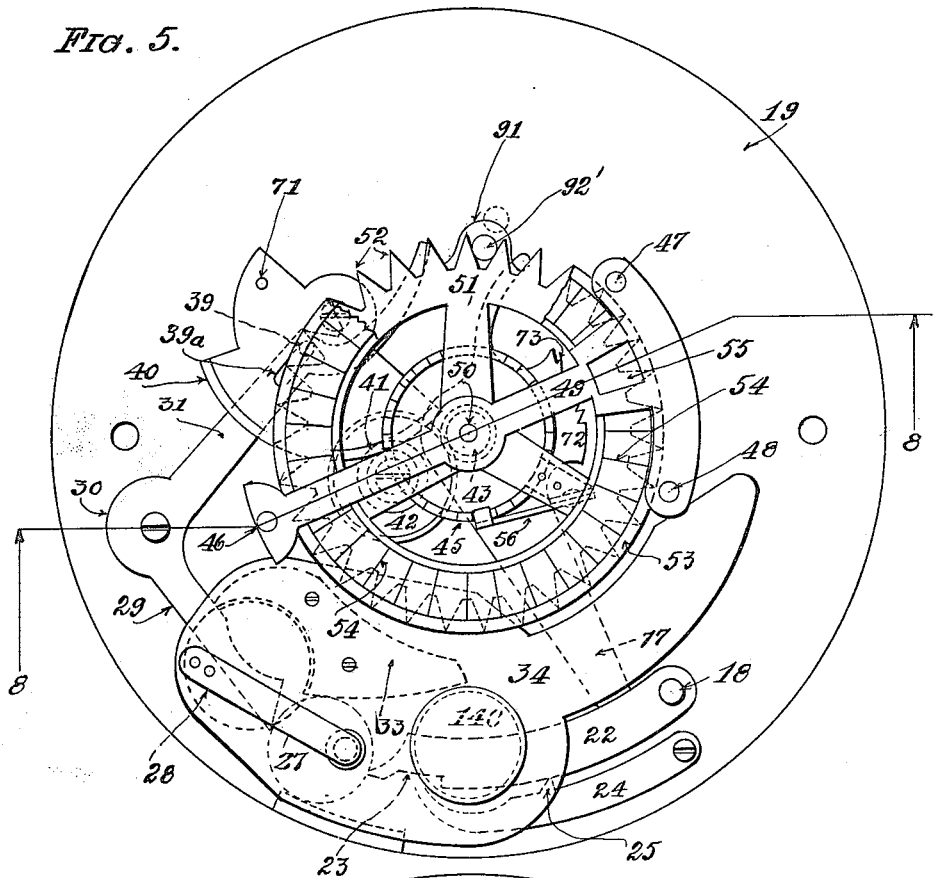
Figure 6:
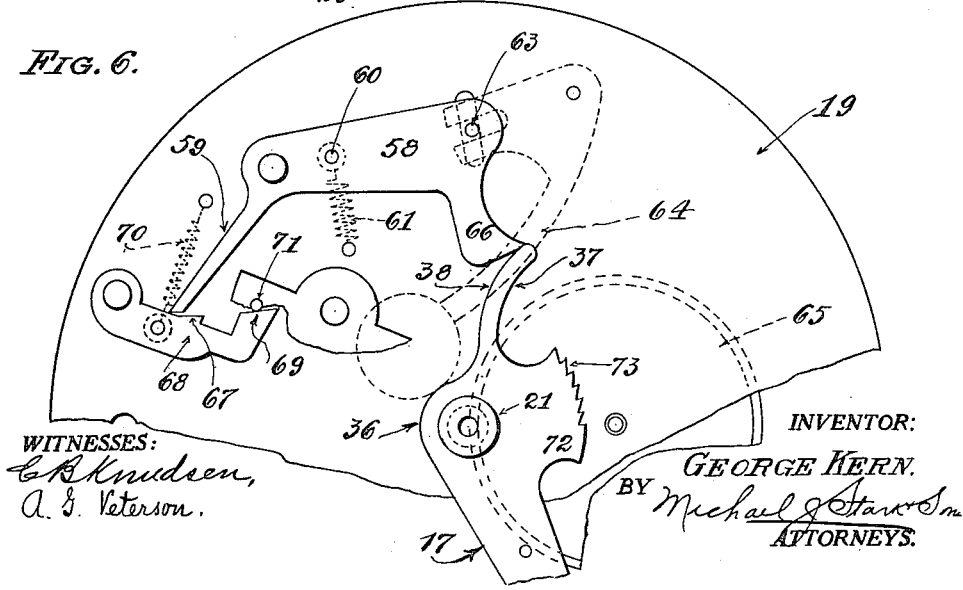
Figure 7:
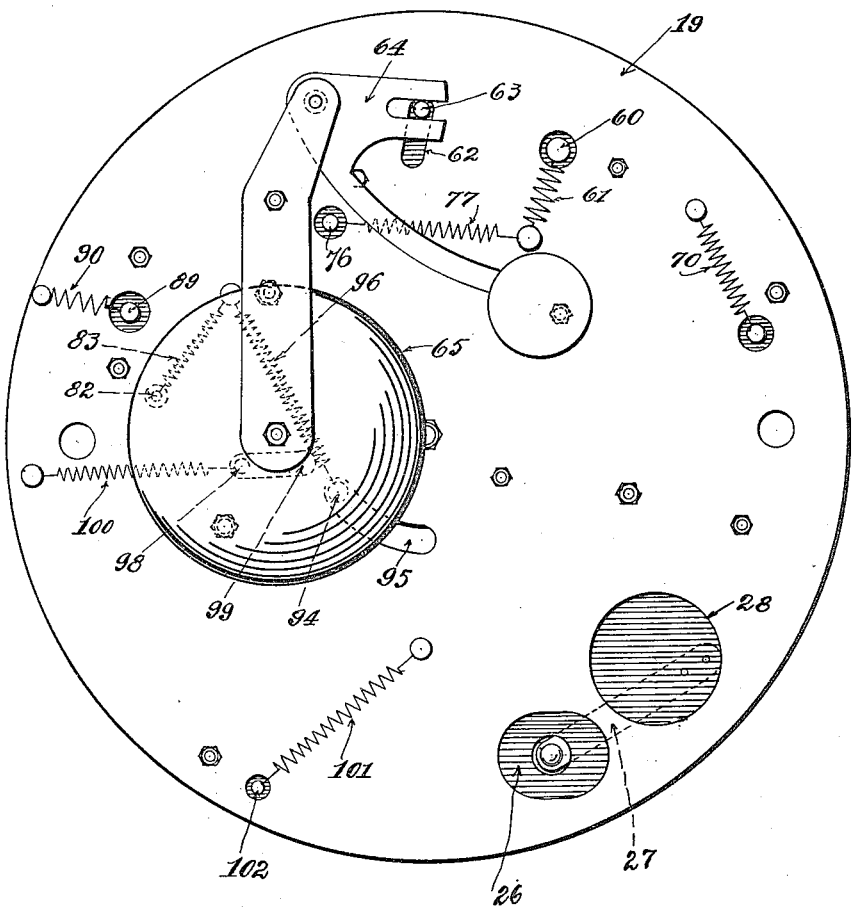

In the drawings which disclose my invention more fully, and which are made a part hereof, Figure 1 is a plan of my invention. Fig. 2 is a front elevation thereof. Fig. 3 is a plan of a disk-like supporting plate upon which is mounted the mechanism for operating the rotatable dial aforesaid, the said dial not being shown, and the mechanism being disclosed in position ready to receive a coin from the coin chute. Fig. 4 is a plan of the disk-like supporting plate with the mechanism in position after the coin has been impelled along the coin guideway by the coin-impelling lever, with the coin about to drop into the interior of the casing. Fig. 5 is a plan of the same supporting-plate, showing the dial and its actuating, and supporting-mechanism. Fig. 6 is a plan of a fragment of the supporting-plate, showing in detail, gong-striking mechanism, indicating the arrival of a coin within the casing. Fig. 7 is a bottom plan of the supporting-plate, showing the location of tension helical springs employed to return the operating mechanism to its initial or original position. Fig. 8 is a vertical section of the casing, cover, dome, and the operating mechanism, taken on line 8—8 of Fig. 5. Fig. 9 is a like section taken on line 9—9 of Fig. 3. Fig. 10 is a similar section on line 10—10 of Fig. 3.

Like parts are indicated by the same characters and symbols of reference in all the figures of the drawings.

In the drawings, A denotes a, preferably cylindrical, open-topped, shell having a bottom B. The upper end of this shell is closed by a cover C, axially of which is located a hollow dome D, the upper end of which is closed by a glass or other transparent disk E. Projecting through the cover C and fastened to the bottom B of the shell A are oppositely disposed rods F. The upper ends of these rods are screw-threaded for the reception of winged nuts G, whereby the cover is securely fastened to the shell. Partially surrounding the dome D, on the cover C, are two arcuate strips H, the free ends of said strips being upturned to form ears 10 and 10ª. These arcuate strips H have arcuate slots 11 through which are passed headed studs 12, so that while the strips may be moved concentrically about the dome D, they may not be lifted from the cover C. The ears 10ª of the strips are intended to be brought into adjacency and they are apertured for the passage therethrough of a padlock 13. The ears 10 of the said strips are in such position when the ears 10ª are in adjacency, as to bear against the winged nuts G and to prevent unscrewing thereof, thereby effectively locking the cover C to the shell A in a simple and efficient manner.

Projecting through the cover is located a cylindrical coin-chute 14 having a coin-slot 15, through which a coin of proper denomination, preferably a nickel, is adapted to be passed. This coin-chute 14 registers with an opening 140, in the plate 19, which opening is slightly larger than the diameter of the coin or token to be employed in this machine, and it serves as means for accurately placing this coin in position; it is obvious, however, that this coin-chute 14, is but an auxiliary device, and that it may be dispensed with if desired, the opening 140 being all that is required to serve as a coin-receiving element. In the face of the cover C, to one side of the coin-chute 14, is located an arcuate slot 16, through which projects an upstanding finger-pin 18. The lower end of this pin is fastened to the coin-impelling lever 17 already referred to.

Within the shell A and spaced a short distance from the cover C, is located a thin sheet metallic supporting-plate 19, upon which all the levers, links, pawls, ratchets and other media to operate the dial are assembled and operatively mounted. This plate is of disk-like contour of a diameter but slightly less than that of the interior of the shell A, and is guided and supported by nuts 20, Fig. 8, on the cover-rods F, or in any other suitable manner. Axially of this supporting-plate the same is suitably punctured for the reception of a bushing 21, which bushing is embraced by the hub 36, of the coin-impelling lever 17, so that this lever is pivoted at the axis of the disk and therefore all motion imparted thereto, is concentric to the periphery of the disk or supporting-plate.

Extending arcuately and laterally from the free end of the coin-impelling lever 17, in a concentric path below the coin-chute 14, or coin-receiving element 140, is a coin-impelling blade 22, from one end of which arises the finger pin 18, and the other end of which is more or less pointed for contact against the edge of a coin received upon the supporting-plate 19 from the coin-receiving element 140. Along the outer edge of this coin-impelling blade is formed an arcuate notch 23, the shoulder of which notch is adapted to be engaged by a catch 24, or a pivoted release-pawl 25, to prevent the continued forward movement of the coin-impelling lever 17. The free end of the release-pawl 25 projects into the path to be taken by the coin, so that when a coin is being impelled along its path the same engages the free end of this release-pawl, disengages the catch 24 from the shoulder of the notch 23, and permits the continued forward movement of the coin-lever 17. It will thus be seen that the insertion of a coin into the coin-receiving element is first of all necessary to effect the proper degree of forward movement of the coin-lever 17 and its impelling-blade 22.

The supporting-plate 19 has an opening 26, located in the path to be taken by a coin. This opening is of a size slightly smaller than the size of a coin of the proper denomination, so that if a coin other than that of the right size be inserted in the coin receiving element, the said coin will be projected through the opening by a properly located blade spring 27, Figs. 3, 5 and 7, and diverted directly into the interior of the shell A, without operating the dial-mechanism.

A proper distance beyond the opening 26 there is provided a coin-opening 28 in the plate 19; and this opening is a trifle larger than the proper coin so as to freely accept the same.

Pivoted to the plate 19 with one leg 29 crossing the opening 28, and located in the path of the coin, is a bell-crank lever 30, the long leg 31 of which terminates in an arcuate, offset, extension 32. Located on the said plate adjacent the opening 28, and extending tangentially of the coin-receiving element 140, is a coin-guide 33, the thickness of which is somewhat greater than that of the coin. The outer periphery of this guide is arcuate and is disposed eccentrically to the path of the impelling blade 22, so that the coin-path is not concentric to the path of the said blade, but is diverted outwardly therefrom, so as to produce a more effective angle of contact of the edge of the coin against the free edge of the short leg 29 of the bell-crank lever 30. Placed over, and fixed to, the guide 33 is a cover 34, so that the coin-path is in reality a covered channel 35, Fig. 9, of a height slightly greater than the thickness of a coin. The coin-chute 14 when employed, may be fixed to this cover, so as to eliminate the possibility of the passage of more than one coin at a time into the coin-path.

Extending from the edge of the hub 36 of the coin-impelling lever substantially opposite the arm 17, is an arcuate arm 37, one edge of which arm co-acts with one edge of the arcuate extension 32 of the bell-crank lever 30, to produce coöperating cam-faces 38, Fig. 3. One of the functions of these cam-faces is as follows:—When the coin-impelling lever 17 is in neutral or normal position as indicated in Fig. 3, these cam-faces are in contact, thereby preventing any outward movement of the short leg of the bell-crank 30. When forward movement of the coin lever 17 is begun, so as to move the coin, the arcuate arm 37 and its cam-face 38 begins to move away from the co-acting cam-face of the extension 32, so as to permit of the outward movement of the short leg of the bell-crank lever 30 under the impulsion of the advancing coin. When, however, the forward journey of the coin-lever 17 has been completed and it retreats to its original position, then the cam face 38 of the arcuate arm 37 again impinges against the like cam face of the extension 32 and enforces the return of the short leg of the bell-crank to its original position across the coin opening 28, in readiness for the next coin.

The long leg 31 of the bell-crank lever 30 has an upstanding pin 39, which engages a radial slot 39$^a$, in a gear segment 40. The teeth of this segment mesh into a pinion 41, formed integral with a superimposed spur-gear 42; and this gear, in turn, meshes into a pinion 43, pivoted about a pin 44, upstanding from the bushing 21 axially of the disk 19. Fixed to this pinion 44 is a crown, ratchet-toothed, wheel 45; and it is to be understood that these pinions and gears form a compound gear-train which greatly speeds up the rate of rotation of the ratchet-wheel 45 in a well understood manner.

Arranged concentrically about the axis of the supporting-plate 19, at suitable points, are upstanding posts 46, 47, and 48, supporting at their upper ends a bearing, and indicating, bar 49, Figs. 1, 5, and 8, the center of which bar is co-incident with the axis of the supporting-plate 19. Journaled centrally of this bar, and of the axial pin 44 located therebelow, is a freely rotatable vertical shaft 50. On this shaft is mounted a balance-wheel 51, the periphery of which is provided with a plurality of equally spaced V-shaped, serrations 52; and fixed to the upper face of this balance-wheel is an annular dial 53 which has a multiplicity of radial graduations and indicia 54. There is an opening or sight 55 in the bearing, and indicating, bar 49, wherethrough the proper indication may be read when the dial is at rest. Depending from the under face of the balance-wheel 51 is a pivoted pawl 56, which pawl engages the teeth of the ratchet-wheel 45 and enforces the rotation of the balance-wheel in one direction. When the ratchet-wheel 45 is rapidly rotating under the impulsion of the gear-train already described, instigated by the bell-crank 30, the balance-wheel 51 and the dial 53 will continue to rotate or spin after the ratchet-wheel has reached the predetermined limit of its rotation, until the stored inertia has become expended, unless the balance-wheel is positively stopped, as will hereinafter be described.

To effect the sounding of a gong on the under side of the supporting-plate 19, indicating the reception of a coin within the shell or casing A, there is provided on the plate 19, an obtuse-angled, medially pivoted, bell-crank arm 57, having a long leg 58, and a short, blunt-pointed, leg 59. Projecting from the leg 58 through the plate 19, is a pin 60, to which is attached a tension helical spring 61, Fig. 7, on the underside of the said plate. And likewise extending through the plate, through an elongated slot 62, is a pin 63 fixed to near the free end of the long leg 58 of the bell-crank arm 57. This said pin 63 engages a gong-striking arm and hammer 64, beneath the plate 19, and the gong 65 is struck under the impulse imparted to the bell-crank arm 57 by the spring 61, and thereby transmitted through the pin 63 to the gong-striking arm 64.

To compel the retreat of the gong-striking arm and hammer 64 from adjacent the gong 65, so as to place the gong-striking mechanism in readiness to indicate the reception of the next succeeding coin within the shell A, there is provided on the long leg 58 of the bell-crank arm 57, a lateral, inwardly extending, projection 66, the periphery of which extension engages the cam-face 38 of the arcuate arm 37 of the coin-lever 17, on its return journey, prior to the time that the said arm co-acts with the cam-face on the extension 32 of the bell-crank lever 30, to return the latter to its original position. As the return of the arcuate arm 37 proceeds, the projection 66 is forced out of its path, moving the long leg 58 of the arm 57 outwardly, and with it the gong-striking arm and hammer 64. When this outward movement has proceeded sufficiently to permit the passage of the arcuate arm 37 beyond the projection 66, then the blunted point of the short leg 59 engages behind a catch 67 on a pivoted holding-pawl 68. This pawl is normally held against the said blunted point by a tension-spring 60, on the under side of the plate 19, and effectively maintains the gong-striking mechanism in inoperative position. At the free end of the holding-pawl 68 there is an upwardly projecting nose 69, reaching underneath the gear-segment 40; and on this segment there is a downwardly extending pin 71, intended to engage the nose of the said holding-pawl and to force the catch 67 out of engagement with the blunted point of the short leg 59, thereby releasing the bell-crank arm 58 and the gong-striking arm and hammer 64, and permitting the same to be acted upon by the spring 61. This pin 71 is so located on the gear-segment 40, that the same will begin to engage the holding-pawl 68 at proximately the same time that the coin is beginning to drop through the opening 28, so that the ringing of the gong 65 and the reception of the coin in the shell A are substantially simultaneous. It may now be explained that the tension in the spring 70 is sufficient to enforce a slight retrograde movement in the gear-segment 40, as soon as the coin frees itself from contact between the side of the opening 28 and the short leg 29 of the bell-crank lever 30 by dropping through the said opening, and as this occurs, the pin 71 on the gear-segment 40 becomes withdrawn from engagement with the nose 69 of the pawl 68, and permits the said pawl to resume its position against the end of the blunt-pointed end 59, Fig. 6, of the bell-crank arm 58, ready for the catch 67 to again engage the said end after the same has been moved into position, as already disclosed.

The hub 36 of the coin-lever is enlarged in diameter between the lever 17 and the arcuate arm 37, to produce a segment 72; and the periphery of this segment is provided with ratchet-teeth 73, which teeth are adapted to engage with the pointed projection 74 of a pivoted ratchet-pawl 75. This pawl has a pin 76, projecting through an opening in the supporting-plate 19, to which pin is attached a tension-spring 77, Fig. 7, constructed to normally maintain the projection 74 in contact with the ratchet-teeth 73. These teeth are so arranged that when the projection 74 of the pawl 75 is in contact therewith, reverse movement, or return, of the coin-impelling lever 17 is prevented. At the free end of the pawl 75 is located an upwardly projecting catch 78, which is constructed to engage a depending catch 79, of a pivoted trip-lever 80, which latter has an arm 81, projecting across the path of the coin-impelling blade 22. The trip-lever 80 has a pin 82, projecting through an opening in the plate 19, and is attached to a tension-spring 83, on the underside of the said plate, to maintain the catch 79 in engagement with the catch 78, as seen in Fig. 4. At the upper end of the trip-lever 80 is provided a laterally extending nose 84, the lower edge of which contacts against the upper edge of an arm 85 of a bell-cranked, medially pivoted, pawl 86. On the opposite arm 87 of this pawl is located a catch 88, for purposes to be described. The arm 85 has a pin 89, projecting through the plate 19, which pin is attached to a tension-spring 90, Fig. 7, constructed to normally maintain the arm 85 against the nose 84, Fig. 4.

When the coin-impelling blade 22 of the coin-impelling lever 17 is in neutral or original position, as in Fig. 3, one end of the said blade contacts against the arm 81 of the trip-lever 80, thereby maintaining the catch 79 away from the catch 78, whereby the projection 74 on the ratchet-pawl 75 is permitted to engage the ratchet-teeth 73. As the coin-impelling blade 22 is moved forwardly, as when impelling a coin toward the opening 28, this projection 74 engages the teeth 73, and prevents retrograde movement of the coin-impelling lever 17 and its said blade 22. As this forward movement approaches its extreme limit, the end of the arcuate arm 37 on the hub 36 of the coin-impelling lever 17, gradually approaches the trip-pawl 75, and finally engages and pushes the same, thereby lifting the projection 74 free from the ratchet-teeth 73, and finally effecting the co-engagement of the catches 78 and 79, so as to maintain the projection 74 free from the teeth 73, whereupon the coin-impelling lever 17 and its blade 22 may return to the neutral or original position. But as the said blade 22 approaches this position, it again engages the arm 81 of the trip-lever 80 which forces the disengagement of the catches 78 and 79 and effects the resetting of the projection 74 on the ratchet-pawl 75 in readiness for the next succeeding movement of the coin-lever 17 and blade 22.

Pivoted about the post 47, Figs. 3, 4 and 10, and overlying the segment 72, the ratchet-pawl 75, the arcuate arms 32 and 37, and the coin-impelling lever 17, there is an oscillating plate 91. This plate is of substantially triangular contour; and near one margin thereof it has an upstanding pin 92', the upper portion of which is normally engaged in one of the V-shaped serrations 52, Fig. 5, of the balance wheel 51, to prevent rotation or oscillation of the said balance wheel when said pin is so engaged.

Along the opposite marginal edge of the oscillating plate 91, are spaced apart, lateral, projections 92 and 93. The first of these projections has a pin 94, extending through the supporting-plate 19, through a slotted opening 95, to which pin is fixed a tension-spring 96, for retaining in, and returning the oscillating plate 91 to its normal position indicated in Fig. 3. Projecting upwardly from the coin-impelling lever 17 is a drive-pin 96$^a$. This pin is adapted to engage the lateral projection 93 of the oscillating plate 91, when the coin-impelling lever 17 is moved forwardly, and thereby move the pin 92 on said oscillating plate out of engagement of the V-shaped serrations 52 on the balance wheel 51. This function is performed very shortly after the forward movement of the coin-lever has begun, but before the coin contacts against the dial-actuating bell-crank lever 30, so that the said dial and the balance-wheel will be free to rotate when movement of the said bell-crank lever begins. Projecting from the under face of the oscillating plate 91 is a holding-pin 97, which pin, when the said plate has moved sufficiently to free the pin 92 from the V-shaped serrations 52 of the balance-wheel 51, engages the catch 88, Fig. 4, on the bell-crank pawl 86, and prevents the return of the said oscillating plate to the normal position until the said catch is released. As already explained, the trip-lever 80 is acted upon by the coin-impelling lever 17 and blade 22 upon their return to neutral position. The nose 84 on the trip-lever, engaging the arm 85 of the bell-crank pawl 86, acts upon this pawl to release the catch 88 from the pin 97, so as to permit the oscillating plate with the pin 92 to be suddenly returned to its normal position, thereby sharply arresting the rotation of the dial 53 and the balance wheel 51 at about the same time that the return movement of the coin-lever 17 and its blade 22 is completed. The function of returning the oscillating plate 91 is accomplished by the spring 96 in an obvious manner.

The coin-impelling lever 17 has a pin 98, Fig. 3, projecting through a slot 99, in the supporting plate 19, and is connected to a tension-spring 100, underneath said plate, to effect the return movement of said lever. The release pawl 25 for locking the coin-impelling blade 22 against extended movement, is impelled into engagement with said blade by a tension-spring 101, acting upon a pin 102, projecting through the supporting blade 19.

It will now be observed that all of the movements of the various levers, bell-crank arms, pawls, and other moving parts, are instituted, in one direction at least, by the coin-impelling lever 17, but the said lever is inoperative to institute these motions until a coin has been introduced into the coin-receiving element, and the releasing-pawl 25 is released from the coin-lever by the coin. Once extended forward movement of the coin lever has begun, this movement must be continued to the end. Should the coin be smaller than the proper denomination, then the same is immediately diverted into the casing and the dial rotating mechanism and the gong-striking media remain inert, but the other movements take place as if a coin of the proper denomination were being acted upon.

I have hereinbefore disclosed the preferred mode of practising my invention, but I reserve the right to make such and any changes as might occur to one skilled in the art to which this invention appertains, without departing from the scope of this invention as set forth in the subjoined claims.

Having thus fully described my invention I claim as new, and desire to secure to myself by Letters Patent of the United States:—

1. A device of the class described, including in combination, a casing, a supporting plate therein, a coin-receiving element, a coin-lever constructed to impel a coin, a coin-impelled pawl constructed to release said lever, dial-rotating means including a ratchet wheel actuated by said coin, a dial, a pawl in connection with said dial constructed to engage said ratchet wheel, and a dial-indicating bar.

2. A device of the class described, including, in combination, a casing, a supporting plate therein, a coin-receiving element, a coin-lever constructed to impel a coin, a dial-rotating mechanism actuated by said coin, a dial, a dial-indicating bar, a gong, and gong-striking means, said gong-striking means being released by said dial-rotating mechanism.

3. A device of the class described, including, in combination, a casing, a supporting plate therein, a coin-receiving element, a coin-lever constructed to impel a coin, a coin-impelled pawl constructed to release said lever, dial-rotating means including a ratchet wheel actuated by said coin, a dial, a pawl in connection with said dial constructed to engage said ratchet wheel, a dial-indicating bar, a gong, and gong-striking means released by said dial-rotating mechanism.

4. A device of the class described, including in combination, a casing, a supporting plate therein, a coin-receiving element, a coin-lever constructed to impel a coin, a coin-impelled pawl constructed to release said lever, dial-rotating means actuated by said coin, a dial, a dial-indicating bar, a gong, and gong-striking means released by said dial rotating mechanism.

5. A device of the class described including, in combination, a casing, a supporting plate therein, a dial, a dial-indicating bar, a coin-receiving element, a coin-lever constructed to impel a coin, a dial-release mechanism actuated by said coin-lever, dial-rotating means actuated by said coin, a gong, gong-striking mechanism released by said dial-rotating means, and dial-stopping means released by said coin-lever.

6. A device of the class described, including, in combination, a casing, a supporting plate therein, a coin-receiving element, a coin-lever constructed to impel a coin, dial-rotating means actuated by said coin, a dial, a dial-indicating bar, a gong, gong-striking mechanism, said gong-striking mechanism being released by said dial-rotating means, and means actuated by said coin-lever for returning said gong-striking mechanism to normal position.

7. A device of the class described, including, in combination, a casing, a supporting plate therein, a coin-receiving element, a coin-lever constructed to impel a coin, a dial-release mechanism actuated by said coin-lever, a dial, a dial-indicating bar, dial-rotating means actuated by said coin, a gong, gong-striking mechanism released by said dial-rotating means, means actuated by said coin-lever for returning said gong-striking mechanism to normal position, and dial-stopping mechanism released by said coin-lever.

8. A device of the class described, including, in combination, a casing, a supporting plate therein, a coin-path thereon, a coin-receiving element in connection therewith, a coin-lever constructed to impel a coin along said path, an arm on said plate intersecting said coin path and actuated by a coin traveling said path, dial-rotating means actuated by said arm, a dial, means connecting said dial to said actuating means constructed to rotate said dial in one direction only, a gong, and gong-striking means released by said dial-actuating means.

9. A device of the class described, including, in combination, a casing, a supporting plate therein, a coin-path thereon, a coin-receiving element in connection therewith, a coin-lever constructed to impel a coin along said path, an arm on said plate intersecting said coin-path and actuated by a coin traveling said path, dial-rotating means actuated by said arm, a dial, means connecting said dial to said actuating means, constructed to rotate said dial in one direction only, a gong, gong-striking means released by said dial-actuating means, and means for setting said gong-striking means actuated by said coin-lever.

10. A device of the class described, including, in combination, a casing, a supporting plate therein, a coin-path thereon, a coin-receiving element in connection therewith, a coin-lever constructed to impel a coin along said path, an arm on said plate intersecting said coin-path and actuated by a coin traveling said path, dial-rotating means actuated by said arm, a dial, means connecting said dial to said actuating means constructed to rotate said dial in one direction only, and dial-releasing means actuated by said coin-lever.

11. A device of the class described, including, in combination, a casing, a supporting plate therein, a coin-path thereon, a coin-receiving element in connection therewith, a coin-lever constructed to impel a coin along said path, an arm on said plate intersecting said coin-path and actuated by a coin traveling said path, dial-rotating means actuated by said arm, a dial, means connecting said dial to said actuating means constructed to rotate said dial in one direction only, and dial-releasing means actuated by said coin-lever, and dial-stopping means released by said coin-lever.

12. A device of the class described, including, in combination, a casing, a supporting plate therein, a coin-path thereon, a coin-receiving element in connection therewith, a coin-lever constructed to impel a coin along said path, an arm on said plate intersecting said coin-path and actuated by a coin traveling said path, dial-rotating means actuated by said arm, a dial, means connecting said dial to said actuating means constructed to rotate said dial in one direction only, a gong, gong-striking means released by said dial-actuating means, and dial-releasing means actuated by said coin-lever.

13. A device of the class described, including, in combination, a casing, a supporting plate therein, a coin-path thereon, a coin-receiving element in connection therewith, a coin-lever constructed to impel a coin along said path, an arm on said plate intersecting said coin-path and actuated by a coin traveling said path, dial-rotating means actuated by said arm, a dial, means connecting said dial to said actuating means constructed to rotate said dial in one direction only, a gong, gong-striking means released by said dial-actuating means, means for setting said gong-striking means actuated by said coin-lever, dial-releasing means actuated by said coin-lever and dial-stopping means released by said coin-lever.

14. A device of the class described, including, in combination, a casing, a supporting plate therein, a coin-path thereon, a coin-receiving element in connection therewith, a coin-lever constructed to impel a coin along said path, an arm, a gong, gong-striking means connected to said arm, spring-impelled means for actuating said arm, a spring catch for restraining said arm, means actuated by said coin for tripping said catch, and an arm on said coin-lever engaging said first named arm for returning the same.

In testimony that I claim the foregoing as my invention, I have hereunto set my hand.

GEORGE KERN.

Copies of this patent may be obtained for five cents each, by addressing the "Commissioner of Patents, Washington, D. C."